United States Patent
Xu et al.

(10) Patent No.: US 10,975,648 B2
(45) Date of Patent: Apr. 13, 2021

(54) DISINTEGRABLE DOWNHOLE TOOLS AND METHOD OF USE

(71) Applicants: YingQing Xu, Tomball, TX (US); Xiaobin Huang, Tomball, TX (US)

(72) Inventors: YingQing Xu, Tomball, TX (US); Xiaobin Huang, Tomball, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 8 days.

(21) Appl. No.: 16/451,474

(22) Filed: Jun. 25, 2019

(65) Prior Publication Data

US 2020/0408054 A1   Dec. 31, 2020

(51) Int. Cl.
*E21B 29/02* (2006.01)
*E21B 43/26* (2006.01)
*C08J 3/09* (2006.01)
*C08J 3/11* (2006.01)
*C08K 3/04* (2006.01)
(Continued)

(52) U.S. Cl.
CPC .......... *E21B 29/02* (2013.01); *C08J 3/092* (2013.01); *C08J 3/11* (2013.01); *C08K 3/04* (2013.01); *C08K 3/08* (2013.01); *C08K 3/40* (2013.01); *E21B 43/26* (2013.01); *C08J 2345/00* (2013.01); *C08J 2375/04* (2013.01)

(58) Field of Classification Search
CPC . E21B 29/02; E21B 43/26; C08J 3/092; C08J 3/11; C08K 3/04; C08K 3/08; C08K 3/40
See application file for complete search history.

(56) References Cited

U.S. PATENT DOCUMENTS

2008/0066924 A1   3/2008   Xu et al.
2009/0159289 A1   6/2009   Avant et al.
(Continued)

FOREIGN PATENT DOCUMENTS

WO   2019054991 A1   3/2019

OTHER PUBLICATIONS

International Search Report for International Application No. PCT/US2020/039299, International Filing Date Jun. 24, 2020, dated Oct. 8, 2020, 5 pages.
(Continued)

*Primary Examiner* — Matthew R Buck
(74) *Attorney, Agent, or Firm* — Cantor Colburn LLP

(57) ABSTRACT

A method for operating in a borehole penetrating a formation is disclosed. The method includes disposing in the borehole an assembly comprising a load-bearing and oil-disintegrable tool comprising a polymeric composite; performing a downhole operation; and disintegrating the load-bearing and oil-disintegrable tool with a hydrocarbon fluid. The polymeric composite comprises an oil-disintegrable polymer which is one or more of the following: a polydicyclopentadiene, polypropylene, polyurethane, polycarbonate, polysulfone, or a high density polyethylene, the polyurethane being a polyhedral oligomeric silsesquioxane-modified polyurethane, a lauryl methacrylate graft polyurethane copolymer, a divinylbenzene crosslinked polyurethane, or a combination comprising at least one of the foregoing.

20 Claims, 3 Drawing Sheets

(51) Int. Cl.
*C08K 3/08* (2006.01)
*C08K 3/40* (2006.01)

(56) References Cited

U.S. PATENT DOCUMENTS

| | | | |
|---|---|---|---|
| 2011/0278011 A1* | 11/2011 | Crainich, Jr. | C08L 69/00 |
| | | | 166/310 |
| 2012/0181032 A1 | 7/2012 | Naedler et al. | |
| 2013/0240200 A1* | 9/2013 | Frazier | E21B 33/134 |
| | | | 166/135 |
| 2013/0240201 A1* | 9/2013 | Frazier | E21B 33/134 |
| | | | 166/135 |
| 2013/0240203 A1* | 9/2013 | Frazier | E21B 33/134 |
| | | | 166/193 |
| 2013/0319668 A1 | 12/2013 | Tschetter et al. | |
| 2015/0299514 A1* | 10/2015 | Chiu | E21B 17/1085 |
| | | | 175/325.1 |
| 2016/0258240 A1 | 9/2016 | Fripp et al. | |
| 2016/0273299 A1* | 9/2016 | Fripp | E21B 33/134 |
| 2019/0144733 A1* | 5/2019 | Fripp | E21B 33/134 |
| | | | 166/387 |

OTHER PUBLICATIONS

Written Opinion for International Application No. PCT/US2020/039299, International Filing Date Jun. 24, 2020, dated Oct. 8, 2020, 7 pages.

* cited by examiner

DISINTEGRABLE DOWNHOLE TOOLS AND METHOD OF USE

BACKGROUND

Certain downhole operations involve placement of articles in a downhole environment, where the articles perform their functions, and are then removed. For example, ball/ball seat assemblies are often used to seal off lower zones in a borehole in order to carry out a hydraulic fracturing process (also referred to in the art as "fracking") to break up reservoir rock. After the fracking operation, the balls or ball seats are then removed to allow fluid flow to or from the fractured rock.

To facilitate removal, such articles may be formed of a material that reacts with a circulation fluid so that they need not be physically removed by, for example, a mechanical operation, but may instead corrode or disintegrate upon contacting with the circulation fluid. One challenge for such self-disintegrable tools is that at the end of hydraulic fracturing operations, sand and debris can settle around the balls/ball seats, making it difficult for the circulation fluid to reach these articles. Thus, the balls/ball seats can fail to disintegrate at the desired rate, delaying the start of well production. Accordingly, advances in removable tools and systems are accordingly well received by the industry.

SUMMARY

A method for operating in a borehole penetrating a formation is disclosed. The method comprises disposing in the borehole an assembly comprising a load-bearing and oil-disintegrable tool comprising a polymeric composite, the polymeric composite comprising an oil-disintegrable polymer which is one or more of the following: a polydicyclopentadiene, polypropylene, polyurethane, polycarbonate, polysulfone, or a high density polyethylene, the polyurethane being a polyhedral oligomeric silsesquioxane-modified polyurethane, a lauryl methacrylate graft polyurethane copolymer, a divinylbenzene crosslinked polyurethane, or a combination comprising at least one of the foregoing; performing a downhole operation; and disintegrating the load-bearing and oil-disintegrable tool with a hydrocarbon fluid.

A downhole assembly having a load-bearing and oil-disintegrable tool is disclosed. The tool comprises a polymeric composite, the polymeric composite comprising about 35 wt % to about 90 wt % of an oil-disintegrable polymer, which is one or more of the following: a polydicyclopentadiene, polypropylene, polyurethane, polycarbonate, polysulfone, or a high density polyethylene, the polyurethane being a polyhedral oligomeric silsesquioxane-modified polyurethane, a lauryl methacrylate graft polyurethane copolymer, a divinylbenzene crosslinked polyurethane, or a combination comprising at least one of the foregoing; and about 10 wt % to about 65 wt % of a reinforcing agent comprising one or more of the following: a glass, a carbon, a metal, or a ceramic, wherein the polymeric composite has a compressive strength of greater than about 25 ksi determined in accordance with ASTM D695-15.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A method for operating in a borehole penetrating a formation is disclosed. The method comprises disposing in the borehole an assembly comprising a load-bearing and oil-disintegrable tool comprising a polymeric composite, which contains an oil-disintegrable polymer; performing a downhole operation; and disintegrating the load-bearing and oil-disintegrable tool with a hydrocarbon fluid.

Figure 1:
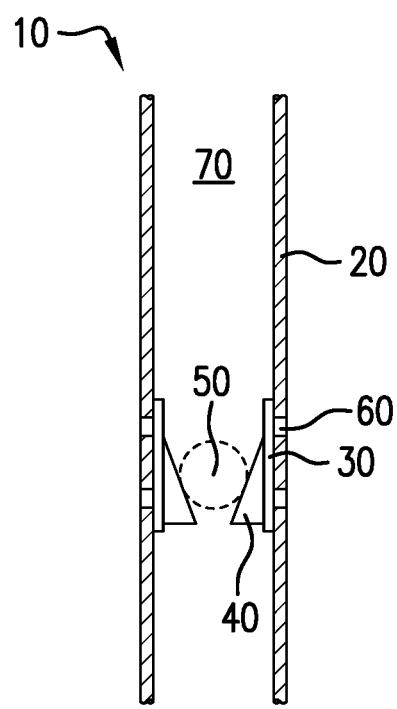
FIG. 1 illustrates an exemplary downhole assembly including an oil-disintegrable tool.

As a specific example, referring now to FIG. 1, a downhole assembly 10 includes a tubular 20 having a passage 70, a sleeve 30, a restriction 40 disposed with the sleeve, and a restrictor 50 that can be engaged with the restriction to block the passage, wherein the restrictor, the restriction, or both are load-bearing and oil-disintegrable tools comprising a polymeric composite. The downhole assembly can also include ports 60.

As used herein, an "oil-disintegrable tool" refers to a tool that loses its mechanical integrity and breaks down partially or completely when contacted with a hydrocarbon, for example, a crude oil produced from a formation. The oil-disintegrable tools disclosed herein comprise a polymeric composite, which in turn contains an oil-disintegrable polymer. Suitable oil-disintegrable polymers include, but are not limited to, polymers that have high mechanical strength and great oil-affinity at the same time. Examples of oil-disintegrable polymer include polydicyclopentadienes, polypropylenes, polyurethanes, polycarbonates, polysulfones (PSU), or high density polyethylenes. Combinations of different polymers can be used.

Polydicyclopentadienes are derived from one or more dicyclopentadiene monomers by a ring opening metathesis polymerization (ROMP). Grubbs-type catalysts, ruthenium and osmium-based catalysts, or other known ROMP catalysts can be used. Co-monomers, such as norbornene monomers other than dicyclopentadiene, cyclopentene, cyclopentadiene, tricyclopentadiene, tetracyclopentadiene, and the derivatives thereof, can also be present. Optionally polydicyclopentadienes are crosslinked. Commercially available polydicyclopentadienes include PROXIMA™, commercially available from MATERIA™ Inc.

Figure 2A:
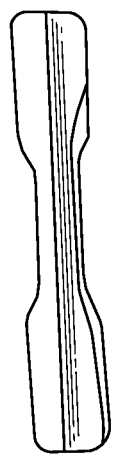
FIG. 2(A) shows a polydicyclopentadiene (PDCPD) sample before aging.
Figure 2B:
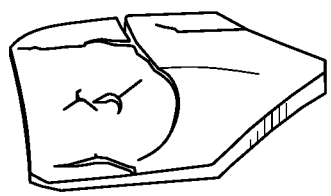
FIG. 2(B) shows the PDCPD sample of FIG. 2(A) after aging in a synthetic produced oil containing toluene, heptane, and cyclohexane at 150° F. for 5.5 hours.
Figure 2B:
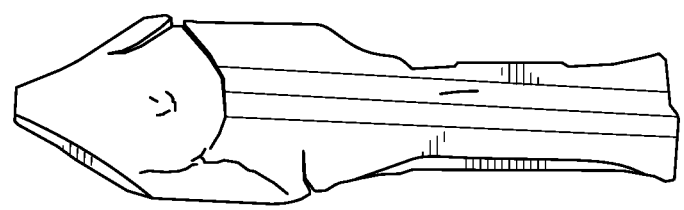

Polydicyclopentadienes such as PROXIMA™ can swell quickly within 5 to 6 hours in a synthetic produced oil containing toluene, heptane, and cyclohexane to double the volume at a temperature as low as 140-150° F. Hardness can decrease from Shore D 70 to Shore A 60. FIG. 2(A) shows a PDCPD sample before aging, and FIG. 2(B) shows the PDCPD sample of FIG. 2(A) after aging in a synthetic produced oil containing toluene, heptane, and cyclohexane at 150° F. for 5.5 hours. As shown in these figures, the PDCPD sample cracks and loses its mechanical strength and integrity after the sample is aged in synthetic hydrocarbons.

"Polycarbonate" means a homopolymer or copolymer having repeating structural carbonate units derived from an aromatic dihydroxy compound such as bisphenol A. The polycarbonate can have a linear or a branched structure. As used herein, polycarbonates includes uncrosslinked polycarbonates as well as crosslinked polycarbonates.

Polyurethanes as used herein include those that are modified with polyhedral oligomeric silsesquioxane (POSS). Both physical methods and chemical methods can be used to incorporate POSS into polyurethane. Physical methods include blending a polyurethane with a POSS. Chemical methods include forming covalent bonds between alcohol-, amine-, or isocyanate-functionalized POSS with a polyurethane network. POSS-modified polyurethanes have high strength, super-hydrophobic property with very high oil absorption capability.

To improve the oleophilic and hydrophobic properties of polyurethane, polyurethane can be grafted with oleophilic monomers such as lauryl methacrylate. Methods of making graft copolymers of polyurethane are known in the art. Optionally polyurethane is crosslinked. In an embodiment, the polyurethane is crosslinked with divinylbenzene.

As used herein, polypropylene and high density polyethylene include homopolymers and copolymers of propylene or ethylene with other olefins such as octene. Polypropylene and high density polyethylene can also be crosslinked using a crosslinking agent. Examples of the crosslinking agent include divinylbenzene.

The oil-disintegrable tools disclosed herein are load bearing parts, and are often subject to high pressures. To improve their mechanical strength, polymeric composites can further include a reinforcing agent dispersed within a matrix formed from the oil-disintegrable polymer. The reinforcing agent includes, glass, carbon, ceramics, metals, or a combination comprising at least one of the foregoing. The reinforcing agent can be present in the form of particulates, fibers, or a combination thereof. Fibers can be long fibers or chopped fibers. As used herein, fibers also can be present in the form of filaments, rovings, yarns, tows, tapes, ribbons, meshes, tubes, braids, fabrics, woven fibers, non-woven fibers, or mats.

Metal fibers are manufactured fibers composed of metal, plastic-coated metal, metal-coated plastic, or a core completely covered by metal. Metal fibers include fibers of aluminum, bronze, steel, zinc, copper, nickel, gold, silver, or the like.

Ceramic fiber based reinforcing materials include ceramic fiber wool such as alkaline earth silicate wool, alumino silicate wool, and polycrystalline wool; refractory ceramic fibers; and ceramic textiles.

Depending on the desired mechanical strength, the polymeric composites can include about 5 to about 65 wt %, about 10 to about 65 wt %, about 20 to about 65 wt %, or about 30 to about 65 wt % the reinforcing agent, each based on the total weight of the polymeric composites.

The load bearing and oil-disintegrable tools can be essentially free of rubbers including natural rubbers and synthetic rubbers. As used herein, "essentially free" means that the oil-disintegrable tools contain, based on the total weight of the oil-disintegrable tools, less than 5 wt %, less than 1 wt %, less than 0.5 wt %, or 0% of synthetic and natural rubbers.

The load bearing and oil-disintegrable tools can also be essentially free of polymers other than those oil-disintegrable polymers disclosed herein. As used herein, "essentially free" means that the oil-disintegrable tools contain, based on the total weight of the tools, less than 5 wt %, less than 1 wt %, less than 0.5 wt %, or 0% of polymers other than the oil-disintegrable polymers disclosed herein.

Specific exemplary polymeric composites comprise a polydicyclopentadiene forming a matrix and a reinforcing agent dispersed in the matrix, the reinforcing agent comprising a glass fiber, a carbon fiber, a ceramic, or a combination comprising at least one of the foregoing. The reinforcing agent can be present in an amount of about 20 wt % to about 40 wt %, or about 25 wt % to about 65 wt %, each based on the total weight of the polymeric composites. The polydicyclopentadiene can be present in an amount of about 60 wt % to about 80 wt %, or about 35 wt % to about 75 wt %, each based on the total weight of the polymeric composites.

The load-bearing and oil-disintegrable tools have excellent compressive strength. In an embodiment, polymeric composites that are used to form the oil-disintegrable, load-bearing tools can have a compressive strength of at least about 25 ksi (kilopound per square inch), in particular about 25 ksi to about 80 ksi or about 20 ksi to about 70 ksi, determined in accordance with ASTM D695-15. Load-bearing tools refer to tools made from compositions that have a compressive strength of at least about 25 ksi (kilopound per square inch), in particular about 25 ksi to about 80 ksi or about 20 ksi to about 70 ksi, determined in accordance with ASTM D695-15.

The restrictors 50 can be any type of ball, dart, plug, etc. that lands at the restriction 40 for blocking fluid flow and enabling creation of a differential pressure. The shape of the restrictors and the restrictions are not particularly limited as along as the restrictions can accommodate restrictors for blocking fluid flow. In an embodiment, the restrictions have a generally cylindrical shape that tapers in a truncated, conical cross-sectional shape such as a ball seat, to allow, for example, a ball to seat and form a seal in the desired downhole location. In a further embodiment, the surface is milled to have a concave region having a radius designed to accommodate a ball or plug. The downhole assembly can include multiple restrictions and restrictors.

Figure 3:
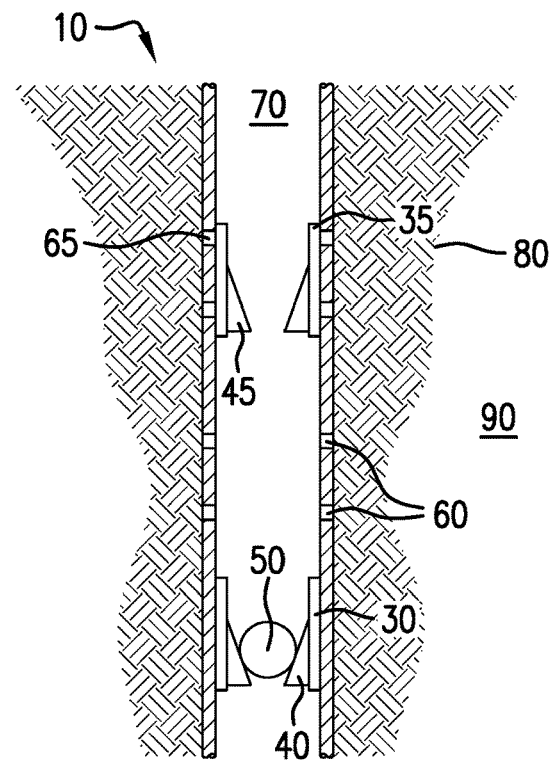
FIG. 3 is a simplified scheme illustrating a method of fracturing or stimulating a formation by disposing an assembly in a borehole, engaging a ball with a ball seat, and performing a fracturing or stimulating operation.
Figure 4:
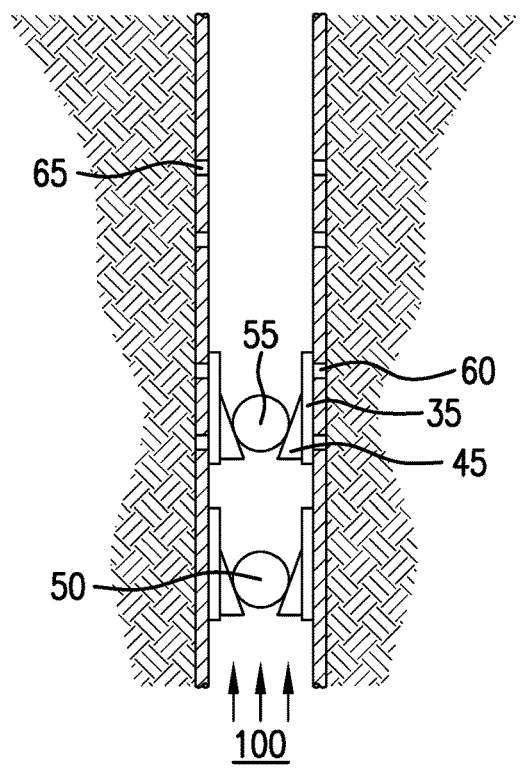
FIG. 4 illustrates the disintegration of the ball in FIG. 3 using a hydrocarbon produced from a lower production zone.

Referring to FIGS. 3 and 4, the downhole assembly 10 is disposed in a borehole 80 formed in formation 90 to facilitate the production of oil and gas. The downhole assembly can be disposed through multiple production zones. Borehole 80 may be a vertical well, a horizontal well, a deviated well, or any combination thereof.

In use, restrictor 50 is landed at restriction 40 disposed with sleeve 30, and blocks fluid flow through passage 70. Blockage of passage 70 enables a pressure differential to form across the restrictor 50 for urging the sleeve 30 from an initial or run-in position in which the ports 60 are closed as shown in FIG. 1 to an actuated position in which the ports 60 are open, as shown in FIG. 3.

Fracturing or stimulating fluids can then be pumped from a fluid source to flow through the opened ports 60 creating fractures. After a desired operation such as fracturing or stimulating operation in a particular zone is performed, restriction 50 and restriction 40, or both can be disintegrated and removed by exposing these articles to a hydrocarbon fluid 100 at a downhole temperature and pressure. The downhole temperature can be about 25° C. to about 300° C., about 65° C. to about 250° C., or about 65° C. to about 150° C. or about 175° C. to about 250° C. The downhole pressure can be about 100 psi to about 15,000 psi. The hydrocarbon fluid contains benzene, cyclohexane, hexane, heptane, toluene, and the alike. Preferably the hydrocarbon fluid is produced from the formation. Examples of the hydrocarbon fluids include crude oil.

Optionally, as shown in FIG. 4, after the fracturing or stimulating operation in a particular zone is performed, a second restrictor 55 can land on a second restriction 45 disposed with sleeve 35. A pressure differential formed across the restrictor 55 urges sleeve 35 to move downwardly, opening ports 65 and closing ports 60. The process can be repeated until all the production zones of interest have been fractured or stimulated.

In addition to restrictors and restrictions, the load-bearing and oil-disintegrable tools that comprise polymeric composites as disclosed herein can also be other downhole tools, including, but are not limited to, frac plugs, bridge plugs, or components thereof.

Set forth below are some embodiments of the foregoing disclosure:

Embodiment 1. A method for operating in a borehole penetrating a formation, the method comprising: disposing in the borehole an assembly comprising a load-bearing and oil-disintegrable tool comprising a polymeric composite, the polymeric composite comprising an oil-disintegrable polymer which is one or more of the following: a polydicyclopentadiene, polypropylene, polyurethane, polycarbonate, polysulfone, or a high density polyethylene, the polyurethane being a polyhedral oligomeric silsesquioxane-modified polyurethane, a lauryl methacrylate graft polyurethane copolymer, a divinylbenzene crosslinked polyurethane, or a combination comprising at least one of the foregoing; performing a downhole operation; and disintegrating the load-bearing and oil-disintegrable tool with a hydrocarbon fluid.

Embodiment 2. The method as in any prior embodiment, wherein the oil-disintegrable polymer comprises the polydicyclopentadiene.

Embodiment 3. The method as in any prior embodiment, wherein the oil-disintegrable polymer comprises the polyurethane.

Embodiment 4. The method as in any prior embodiment, wherein the polymeric composite further comprise a reinforcing agent dispersed in a matrix formed from the disintegrable polymer.

Embodiment 5. The method as in any prior embodiment, wherein the reinforcing agent comprises one or more of the following: a glass, a carbon, a metal, or a ceramic.

Embodiment 6. The method as in any prior embodiment, wherein the polymeric composite comprises about 35 wt % to about 90 wt % of the oil-disintegrable polymer and about 10 wt % to about 65 wt % of the reinforcing agent based on the total weight of the oil-disintegrable composite.

Embodiment 7. The method as in any prior embodiment, wherein the polymeric composite has a compressive strength of greater than about 25 ksi determined in accordance with ASTM D695-15.

Embodiment 8. The method as in any prior embodiment, wherein the load-bearing and oil-disintegrable tool is essentially free of polymers other than the oil-disintegrable polymer.

Embodiment 9. The method as in any prior embodiment, wherein the downhole operation is a fracturing operation or a stimulation operation.

Embodiment 10. The method as in any prior embodiment, wherein the hydrocarbon fluid comprises benzene, cyclohexane, hexane, heptane, toluene, or a combination comprising at least one of the foregoing.

Embodiment 11. The method as in any prior embodiment, wherein the hydrocarbon fluid is a crude oil produced from the formation.

Embodiment 12. The method as in any prior embodiment, wherein the load-bearing and oil-disintegrable tool is a frag plug, a bridge plug, a restriction, a restrictor, or a component thereof.

Embodiment 13. The method as in any prior embodiment, wherein the assembly comprises a tubular having a passage and a restriction positioned inside the tubular; and the method further comprises engaging a restrictor with the restriction to block the passage; wherein at least one of the restrictor and the restriction is the load-bearing and oil-disintegrable article.

Embodiment 14. The method as in any prior embodiment, further comprising removing the disintegrated load-bearing and oil-disintegrable tool from the borehole.

Embodiment 15. A downhole assembly having a load bearing and oil-disintegrable tool, wherein the load-bearing and oil-disintegrable tool comprises a polymeric composite, the polymeric composite comprising about 35 wt % to about 90 wt % of an oil-disintegrable polymer, which is one or more of the following: a polydicyclopentadiene, polypropylene, polyurethane, polycarbonate, polysulfone, or a high density polyethylene, the polyurethane being a polyhedral oligomeric silsesquioxane-modified polyurethane, a lauryl methacrylate graft polyurethane copolymer, a divinylbenzene crosslinked polyurethane, or a combination comprising at least one of the foregoing; and about 10 wt % to about 65 wt % of a reinforcing agent comprising one or more of the following: a glass, a carbon, a metal, or a ceramic, wherein the polymeric composite has a compressive strength of greater than about 25 ksi determined in accordance with ASTM D695-15.

Embodiment 16. The downhole assembly as in any prior embodiment, wherein the polymeric composite comprises about 35 to about 80 wt % of the polydicyclopentadiene; and about 20 wt % to about 65 wt % of the reinforcing agent.

Embodiment 17. The downhole assembly of any prior embodiment wherein the polymeric composite comprises the polyurethane and the reinforcing agent.

Embodiment 18. The downhole assembly of any prior embodiment, wherein the load-bearing and oil-disintegrable tool is essentially free of polymers other than the disintegrable polymer.

Embodiment 19. The downhole assembly of any prior embodiment, wherein the load-bearing tool and oil-disintegrable tool is a frag plug, a bridge plug, a restriction, a restrictor, or a component thereof.

Embodiment 20. The downhole assembly of any prior embodiment comprising: a tubular having a passage; a restriction positioned inside the tubular; and a restrictor engaged with the restriction to block the passage; wherein at least one of the restrictor and the restriction is the load-bearing article.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method for operating in a borehole penetrating a formation, the method comprising:
   disposing in the borehole an assembly comprising a load-bearing and oil-disintegrable tool comprising a polymeric composite, the polymeric composite comprising an oil-disintegrable polymer which is one or more of the following: a polydicyclopentadiene, or a polyurethane, the polyurethane being a polyhedral oligomeric silsesquioxane-modified polyurethane, a lauryl methacrylate graft polyurethane copolymer, a divinylbenzene crosslinked polyurethane, or a combination comprising at least one of the foregoing, the polymeric composite having a compressive strength of greater than about 25 ksi determined in accordance with ASTM D695-15;
   performing a downhole operation; and
   disintegrating the load-bearing and oil-disintegrable tool with a hydrocarbon fluid,
   wherein the hydrocarbon fluid comprises benzene, cyclohexane, hexane, heptane, toluene, or a combination comprising at least one of the foregoing; or
   the hydrocarbon fluid is a crude oil produced from the formation.

2. The method of claim 1, wherein the oil-disintegrable polymer comprises the polydicyclopentadiene.

3. The method of claim 1, wherein the oil-disintegrable polymer comprises the polyurethane.

4. The method of claim 1, wherein the polymeric composite further comprise a reinforcing agent dispersed in a matrix formed from the oil-disintegrable polymer.

5. The method of claim 4, wherein the reinforcing agent comprises one or more of the following: a glass, a carbon, a metal, or a ceramic.

6. The method of claim 4, wherein the polymeric composite comprises about 35 wt % to about 90 wt % of the oil-disintegrable polymer and about 10 wt % to about 65 wt % of the reinforcing agent based on the total weight of the polymeric composite.

7. The method of claim 1, wherein the load-bearing and oil-disintegrable tool is essentially free of polymers other than the oil-disintegrable polymer.

8. The method of claim 1, wherein the downhole operation is a fracturing operation or a stimulation operation.

9. The method of claim 1, wherein the hydrocarbon fluid comprises the benzene, the cyclohexane, the hexane, the heptane, the toluene, or the combination comprising at least one of the foregoing.

10. The method of claim 1, wherein the hydrocarbon fluid is the crude oil produced from the formation.

11. The method of claim 1, wherein the load-bearing and oil-disintegrable tool is a frag plug, a bridge plug, a restriction, a restrictor, or a component thereof.

12. The method of claim 1, wherein the assembly comprises a tubular having a passage and a restriction positioned inside the tubular; and the method further comprises engaging a restrictor with the restriction to block the passage; wherein at least one of the restrictor and the restriction is the load-bearing and oil-disintegrable tool.

13. The method of claim 1, further comprising removing the disintegrated load-bearing and oil-disintegrable tool from the borehole.

14. A downhole assembly having a load-bearing and oil-disintegrable tool, wherein the load-bearing and oil-disintegrable tool comprises a polymeric composite, the polymeric composite comprising
   about 35 wt % to about 90 wt % of an oil-disintegrable polymer, which is a polyurethane, the polyurethane being a polyhedral oligomeric silsesquioxane-modified polyurethane, a lauryl methacrylate graft polyurethane copolymer, a divinylbenzene crosslinked polyurethane, or a combination comprising at least one of the foregoing; and
   about 10 wt % to about 65 wt % of a reinforcing agent comprising one or more of the following: a glass, a carbon, a metal, or a ceramic,
   wherein the polymeric composite has a compressive strength of greater than about 25 ksi determined in accordance with ASTM D695-15.

15. The downhole assembly of claim 14, wherein the polymeric composite comprises the polyurethane and the reinforcing agent.

16. The downhole assembly of claim 14, wherein the load-bearing and oil-disintegrable tool is essentially free of polymers other than the oil-disintegrable polymer.

17. The downhole assembly of claim 14, wherein the load-bearing tool and oil-disintegrable tool is a frag plug, a bridge plug, a restriction, a restrictor, or a component thereof.

18. The downhole assembly of claim 14 comprising:
   a tubular having a passage;
   a restriction positioned inside the tubular; and
   a restrictor engaged with the restriction to block the passage;
   wherein at least one of the restrictor and the restriction is the load-bearing and oil-disintegrable tool.

19. The downhole assembly of claim 14, wherein the polyurethane comprises the lauryl methacrylate graft polyurethane copolymer.

20. The downhole assembly of claim 14, wherein the polyurethane comprises the divinylbenzene crosslinked polyurethane.

* * * * *